United States Patent [19]

Ichiki et al.

[11] 3,816,275
[45] June 11, 1974

[54] PROCESS FOR TREATMENT OF WASTE LIQUORS CONTAINING DIFFICULTY DECOMPOSABLE CYANO-COMPLEX

[75] Inventors: Minoru Ichiki; Masahito Ishii, both of Tokyo, Japan

[73] Assignee: Mitsui Mining & Smelting Co., Ltd., Tokyo, Japan

[22] Filed: Feb. 8, 1973

[21] Appl. No.: 330,473

[30] Foreign Application Priority Data
Feb. 15, 1972  Japan.............................. 47-16206

[52] U.S. Cl.................................. 204/149, 204/130
[51] Int. Cl................................................ C02c 5/12
[58] Field of Search ............... 204/149, 130; 210/44

[56] References Cited
UNITED STATES PATENTS
937,210   10/1909   Harris................................. 204/149
2,520,703  8/1950   Wagner............................ 204/149 X
2,737,298  3/1953   Hendel................................ 204/149
2,773,025  12/1956  Ricks et al. ......................... 204/149
3,645,867  2/1972   Ericson et al..................... 204/149 X
3,756,932  9/1973   Zievers et al. ...................... 204/149

Primary Examiner—John H. Mack
Assistant Examiner—A. C. Prescott
Attorney, Agent, or Firm—Woodhams, Blanchard & Flynn

[57] ABSTRACT

A process for treating a waste liquor containing a difficultly decomposable cyano-complex such as ferrocyanides and ferricyanides and/or cyano ions, which comprises electrolyzing said waste liquor by employing iron as an anode to thereby form water-insoluble colloid, floating and concentrating said colloid by an action of bubbles formed during the electrolysis to thereby convert it to a scum, and removing the scum from said waste liquor in an electrolytic cell to thereby obtain a purified liquor free of cyano-component.

4 Claims, No Drawings

PROCESS FOR TREATMENT OF WASTE LIQUORS CONTAINING DIFFICULTY DECOMPOSABLE CYANO-COMPLEX

BACKGROUND OF THE INVENTION

1. Field of the Invention:

This invention relates to a process for removing cyano-complex from a waste liquor containing a difficulty decomposable cyano-complex or cyanide-containing compound such as ferrocyanides and ferricyanides. More specifically, the invention relates to a process comprising electrolyzing a waste liquor containing a difficulty decomposable cyano-complex or cyanide-containing salt under a direct current with use of iron as an anode to thereby convert said complex or said salt to a blue, colloidal precipitate, floating the precipitate to thereby concentrate it in the form of a scum in the upper portion of said liquor in an electrolytic cell, and removing the scum to thereby obtain a purified liquor.

2. Description of the Prior Art:

In accordance with conventional techniques, a cyanide-containing waste liquor is purified by methods comprising making such waste liquor alkaline, oxidatively decomposing the cyanide component with a chlorine-type oxidant such as chlorine, sodium hypochloride and bleaching powder or decomposing it after it has been made strongly acidic, and catching a cyan (CN) gas or cyanogen generated by the decomposition with use of an alkali. Among these methods, the oxidative decomposition method employing an oxidant of the chlorine type is utilized most broadly. However, each of these known methods is suitable only for the treatment of a waste water containing a cyanide-containing compound which is decomposable relatively with ease, such as alkali metal cyanides, alkaline earth metal cyanides, zinc cyanide, cadmium cyanide and the like, and according to these known methods it is impossible to decompose completely such compounds as copper cyanide, silver cyanide and iron cyanide. Accordingly, if such compounds are contained in waste liquors, the cyano-component cannot be completely removed by these conventional methods.

SUMMARY OF THE INVENTION

The present invention is to provide a method for treating waste liquors containing such difficulty decomposable cyano-complex or cyanide ions, by which cyano-component contained in said liquors can be removed completely and conveniently.

The cyanide ion ($CN^-$) reacts with an iron ion in a solution to form a ferrocyanide or ferricyanide ion-containing complex salt, and in many cases, the complex is converted to Berlin Blue (also called "Prussian Blue") because of the presence of excessive iron ions.

The formula of an example of such reaction is as follows:

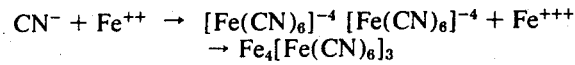

Among cyano-complexes, iron cyano-complexes are relatively low in the toxicity, and they were used for the treatment of waste liquors in the past. However, since it was found that they are decomposed under sun-light to form poisonous cyanogen, it has been prohibited to discharge such compounds into rivers.

These water-insoluble cyano-complex salts are present in the form of a very minute colloid in a waste liquor and according to customary techniques it is very difficult to remove them by the solid-liquid separation.

We, the inventors, have found that ferrocyanide ions, ferricyanide ions and other difficulty decomposable cyano-complex ions are electrolyzed by employing iron as an anode, these ions are converted similarly to a blue colloid of Prussian Blue irrespectively of the kind of the complex ion, and such colloid is floated on the liquid surface and can readily be removed, and we have completed this invention by applying this finding to the treatment of waste liquors.

In the chemical reaction, when a trivalent iron ion is added to a ferrocyanide ion or when a divalent iron ion is added to a ferricyanide ion, a blue precipitate is formed. However, even if a divalent iron ion is added to a ferrocyanide ion, formation of a blue colloid is not observed. Accordingly, in order to obtain an insoluble precipitate by adding an iron ion to a difficulty decomposable cyanide ion, it is necessary to grasp amounts of the ferrocyanide and ferricyanide ions, respectively. This is very troublesome in conducting the waste liquor treatment. In contrast, according to the process of this invention ferrocyanide ion, ferricyanide ion and other difficulty decomposable ions contained in a waste liquor can be similarly converted to blue insoluble colloids regardless of the kind of the ion only by electrolyzing such waste liquor by employing iron as an anode, and the resulting colloids are readily electrically discharged by an action of an electric field formed by the electrolysis to form coarse particles, which absorb a gas formed by the electrolysis and are readily floated on the surface of the waste liquor to form a scum, with the result that the solid-liquid separation can easily be accomplished and cyano components can be removed from the waste liquor by simple operational procedures.

In case, during the stage of the electrolysis according to this invention, at least one member selected from high molecular coagulants, oils and surface active agents is added in a small quantity to a waste liquor to be treated, the tendency of the colloid to float on the liquor surface and to be separated from the liquor is further improved. The following substances are preferably used as such floating and separating property improving agent, and it is desired that these substances are added in amounts of 2 mg to 100 mg per liter of the waste liquor.

High Molecular Coagulants:
  acrylamide, acrylamide derivatives, sodium salt of polyacrylic acid and sodium salts of polyacrylic acid derivatives;

Oils:
  vegetable oils such as rape-seed oil and soybean oil; animal oils such as tallow oil; and mineral oils such as naphtha having a high-boiling point;

Surface Active Agents:
  anionic surfactants such as sodium salts of alkylbenzenesulfonates or alkaline soap; nonionic surfactants such as polyoxyethylene oleylether, polyoxyethylene alkylarylether, polyethyleneglycol monolaurate and sorbitan monolaurate.

Iron is used as an anode at the electrolysis according to this invention, but it is unnecessary to employ too an expensive iron material and commercially available ordinary iron materials such as iron plates, cast iron rods, cast iron plates, carbon steel and the like can be used conveniently. And, a cage filled with scraps of the aforesaid iron materials can also be used as an anode. A cathode composed of an iron material such as exemplified above can be used. In addition, graphite, stainless steel, nickel, copper and the like may be used as a cathode. Electrolytic conditions such as the cell voltage and current and the distance between both the electrodes are not particularly critical in this invention. In short, the electrolytic conditions are so selected that an electrical current is allowed to pass through the waste liquor. In general, however, it is preferred that the electrolysis is carried out under cell voltage of from 2 to 40 volts and an electrolytic current of from 0.1 to 5 A. per 1 liter of electrolyte which is composed of waste liquor.

The process of this invention can be applied to the treatment of various waste liquors containing cyano-complexes, which are formed in various factories and plants, and can give very good results in the treatment of such waste liquors.

PREFERRED EMBODIMENTS OF THE INVENTION

Example 1.

A waste liquor consisting of an aqueous solution containing 80 mg/$l$ of potassium ferricyanide was subjected to an electrolysis.

The electrolysis was carried out in an electrolytic cell having a 10-liter capacity by employing iron plates as anode- and cathode-electrodes and passing an electric current of 5 A. At prescribed intervals the liquor was sampled from the lower portion of the electrolytic cell, and the cyan (CN) content was determined by the quantitative analysis. Results are shown in Table 1.

Table 1

| Electrolytic Time (minutes) | CN Analysis Value (ppm) (potasium ferricyanide-containing liquor) |
|---|---|
| at initiation of electrolysis (starting liquor) | 41 |
| 5 | 37 |
| 10 | 32 |
| 15 | 19 |
| 40 | 2 |
| 60 | 0.75 |

Example 2.

An aqueous solution containing 100 mg/$l$ of potassium ferricyanide, 5 mg/$l$ of mineral oil (solvent naphtha) and 3 mg/$l$ of an anionic surfactant (alkaline soap), and an aqueous solution containing 100 mg/$l$ of potassium ferrocyanide, 100 mg/$l$ of rape-seed oil and 100 mg/$l$ of a nonionic surfactant (polyethyleneglycol monolaurate) were used as a liquor to be treated. The electrolysis was carried out in an electrolytic cell having a 10-liter capacity by employing iron plates as electrodes and passing an electric current of 5 A. At prescribed intervals the liquor was sampled from the lower portion of the electrolytic cell, and the cyan (CN) content was determined by the quantiative analysis. Results are shown in Table 2.

Table 2

| Electrolytic Time (minutes) | CN Analysis Value (ppm) (potassium ferrocyanide-containing liquor) | CN Analysis Value (ppm) (potassium ferricyanide-containing liquor) |
|---|---|---|
| at initiation of electrolysis (starting liquor) | 43 | 51 |
| 5 | 38 | |
| 10 | 33 | 31 |
| 15 | 21 | 16 |
| 40 | 0.10 | 0.59 |
| 60 | 0.06 | 0.06 |

From the results shown in Table 2, it will readily be understood that aqueous solutions containing ferrocyanide and ferricyanide ions can be easily purified regardless of the kind of the ion contained and cyano components can be removed by conducting the electrolysis with use of iron as an anode.

Example 3.

A waste liquor formed in the quenching factory, which contains oil (xylol) and cyano components composed mainly of 440 ppm of a ferrocyanide ion (1,080 ppm as the total cyan content and 200 ppm as the free cyan content), was electrolyzed in an electrolytic cell such as employed in Example 1 in the same manner as adopted in Example 1, and at prescribed intervals the sample liquor was withdrawn from the bottom of the electrolytic cell to determine the cyan content. Results are shown in Table 3.

Table 3

| Electrolytic Time (minutes) | CN Analysis Value (ppm) |
|---|---|
| at initiation of electrolysis (starting liquor) | 1080 |
| 5 | 680 |
| 10 | 560 |
| 30 | 84 |
| 40 | 40 |
| 60 | 0.85 |
| 90 | 0.35 |

From the results shown in Table 3 it is proved that also in the case of actual waste liquors cyano components can be removed very effectively according to the process of this invention.

What is claimed is:

1. A process for treating waste liquor containing difficulty decomposable cyano-complex and/or cyan ions, which comprises electrolyzing said waste liquor in an electrolytic cell by employing iron as an anode to thereby form a water-insoluble colloid, floating said colloid on the upper surface portion of the liquor by an action of bubbles generated by the electrolysis to thereby convert the colloid to a scum, and removing the scum from the electrolytic cell to thereby obtain a purified liquor substantially free of cyano-component.

2. A process according to claim 1, wherein the waste liquor contains a ferrocyanide and/or a ferricyanide.

3. A process according to claim 1, wherein the anode is an iron plate.

4. A process according to claim 1, wherein at least one agent selected from the group consisting of high molecular coagulants, mineral oils, animal oils, vegetable oils and surface active agents is added to the waste liquor and then the electrolysis is carried out.

* * * * *

UNITED STATES PATENT OFFICE
CERTIFICATE OF CORRECTION

Patent No. 3,816,275   Dated June 11, 1974

Inventor(s) Minoru Ichiki and Masahito Ishii

It is certified that error appears in the above-identified patent and that said Letters Patent are hereby corrected as shown below:

On the title page, second line of title; change "DIFFICULTY" to ---DIFFICULTLY---.

Col. 1, line 2; change "DIFFICULTY" to ---DIFFICULTLY---.

line 10; change "culty" to ---cultly---.

line 14; change "difficulty" to ---difficultly---.

line 48; change "difficulty" to ---difficultly---.

Col. 2, line 9; change "difficulty" to ---difficultly---.

line 23; change "difficulty" to ---difficultly---.

line 29; change "difficulty" to ---difficultly---.

Col. 3, line 29; change "electrical" to ---electric---.

Col. 4, line 11; change "quantiative" to ---quantitative---.

line 35; change "the" to ---a---.

line 64; change "culty" to ---cultly---.

Signed and sealed this 15th day of October 1974.

(SEAL)
Attest:

McCOY M. GIBSON JR.
Attesting Officer

C. MARSHALL DANN
Commissioner of Patents